L. W. ZAAR.
ANTIFRICTION BEARING.
APPLICATION FILED APR. 21, 1916.
1,222,059.
Patented Apr. 10, 1917.
2 SHEETS—SHEET 1.
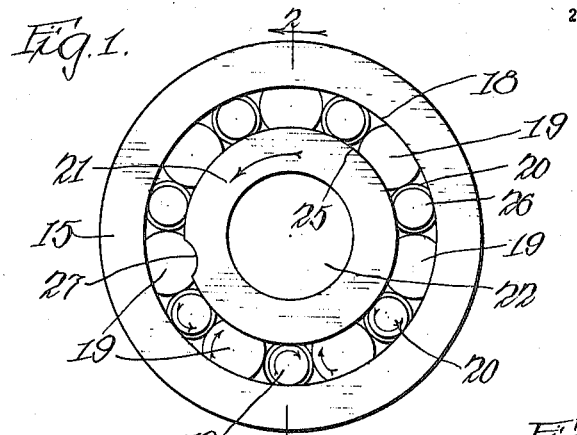
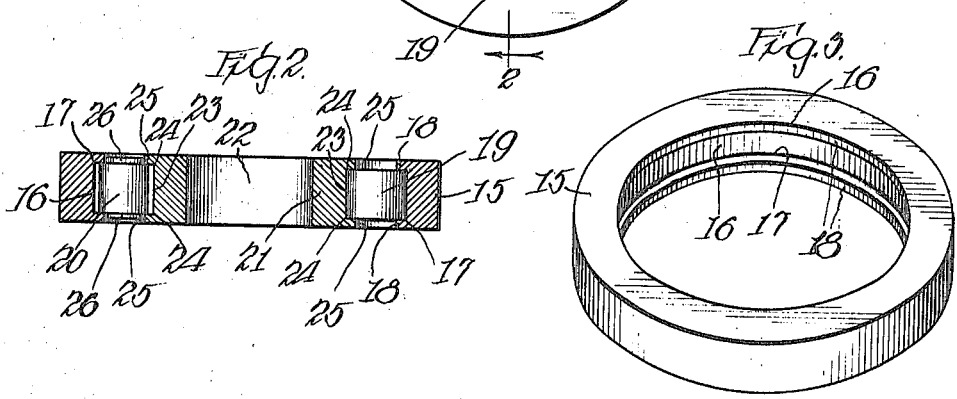
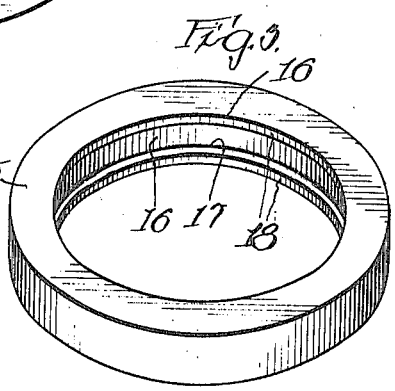
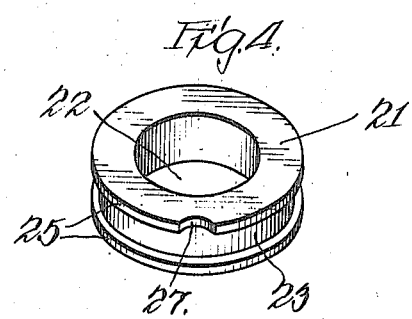
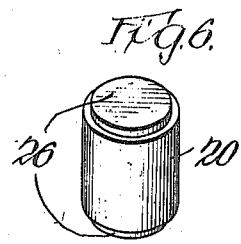
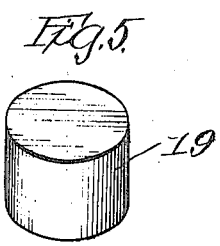
Witness:
Leo J. Dumais.
Inventor:
Ludwig W. Zaar.
By Chas. C. Tillman
Atty.

L. W. ZAAR.
ANTIFRICTION BEARING.
APPLICATION FILED APR. 21, 1916.
1,222,059.
Patented Apr. 10, 1917.
2 SHEETS—SHEET 2.
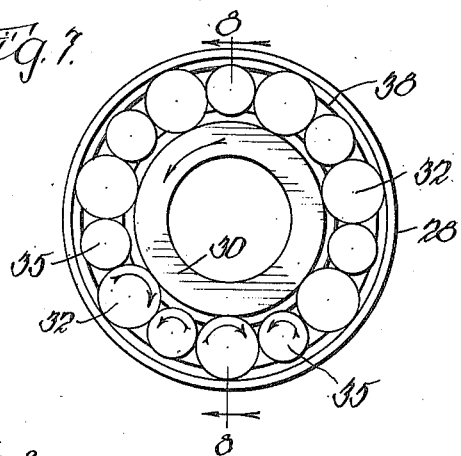
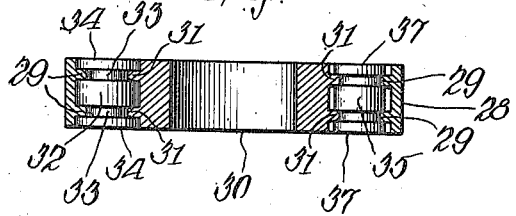
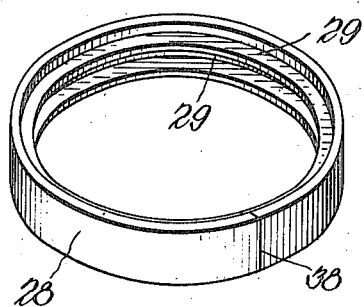
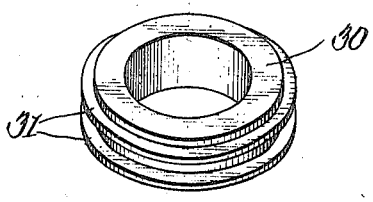
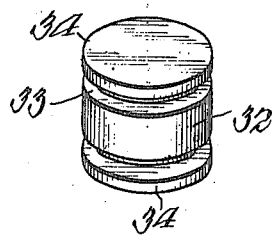
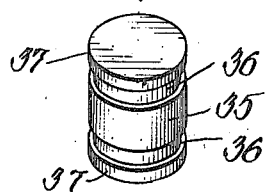
Witness:
Leo P. Dumais.
Inventor:
Ludwig W. Zaar.
By Chas. C. Tillman
Atty.

UNITED STATES PATENT OFFICE.

LUDWIG W. ZAAR, OF CHICAGO, ILLINOIS.

ANTIFRICTION-BEARING.

1,222,059.

Specification of Letters Patent.　　Patented Apr. 10, 1917.

Application filed April 21, 1916.　Serial No. 92,575.

*To all whom it may concern:*

Be it known that I, LUDWIG W. ZAAR, a citizen of the United States, and resident of Chicago, in the county of Cook and State of Illinois, have invented certain new and useful Improvements in Antifriction-Bearings, of which the following is a specification.

This invention relates to certain new and useful improvements in anti-friction bearings, and it consists in certain peculiarities of the construction, novel arrangement and operation of the various parts thereof as will be hereinafter more fully set forth and specifically claimed.

The principal object of the invention is to provide an anti-friction bearing, which shall be extremely simple and inexpensive in construction, strong and durable, and so made that the parts thereof can be readily assembled for use, or disassembled for repairs or the replacement of parts, should any of them become defective or impaired. Another and important object of the invention is to so construct, combine, and arrange the various parts of the bearing as to reduce to a minimum the friction incident to the operation of the parts, to the end that great ease of operation as well as high rotary speed will be afforded to the part or parts of the machine or machinery for which the bearing is used.

Other objects and advantages of the invention will be disclosed in the subjoined description and explanation.

In the accompanying drawings which serve to illustrate the invention—

Figure 1 is a face view of an anti-friction bearing device embodying one form of the invention, showing the parts thereof in position for use and indicating by arrows the direction of the movement of some of the roller bearings, when under pressure, of the device.

Fig. 2 is a sectional view taken on line 2—2 of Fig. 1 looking in the direction indicated by the arrows.

Fig. 3 is a detached perspective view of the outer ring or casing of the bearing.

Fig. 4 is a similar view of the inner ring of the bearing.

Fig. 5 is a like view of one of the larger rollers of the bearing.

Fig. 6 is a perspective view of one of the smaller rollers of the bearing.

Fig. 7 is a face view of the anti-friction bearing device embodying a modification in the construction thereof.

Fig. 8 is a sectional view taken on line 8—8 of Fig. 7 looking in the direction indicated by the arrows.

Fig. 9 is a detached perspective view of the outer ring or casing of the bearing device.

Fig. 10 is a similar view of the inner ring, employed in the modified form shown in Figs. 7 to 9 inclusive.

Fig. 11 is a detached perspective view of a modified form of one of the larger rollers used in the above mentioned modification and Fig. 12 is a like view of one of the small rollers used in said modified construction.

Like numerals of reference refer to corresponding parts throughout the different views of the drawings.

Referring now to Figs. 1 to 6 inclusive of the drawings, the reference numeral 15 designates the outer ring or casing of the bearing, which may be made of any suitable size and material. As shown, this ring or casing has in its inner periphery a groove 16 which is angular in cross section, that is to say, said groove extends circumferentially on the inner surface of the ring or casing 15 and has an angle 17 near each side of the ring or casing 15 which angles are provided by the inwardly extended shoulders or flanges 18 with which the member 15 is formed or provided. Located in the race, track, or groove 16, so as to be guided thereby, are a series of cylindrical rollers 19 which are of sufficient length to fit snugly between the flanges 18 of the casing or ring 15, as will be readily understood by reference to Fig. 2 of the drawings, in which figure, as well as in Fig. 5 it will be seen and understood that the rollers 19 are preferably cylindrical in shape and are without any reduced portions on their ends. Located alternately between the larger rollers 19, are a series of smaller rollers 20, each of which has a cylindrical body of less diameter than the rollers 19, so that said smaller rollers will not contact with the wall of the groove or race 16, as will be clearly understood by reference to Fig. 2 of the drawings. Located within the circular row of rollers 19 and 20 is an inner ring 21 which has an opening 22 therein to receive the shaft, axle, or other part of a machine for which the bearing is furnished. The ring 21 is provided on its outer periphery with a groove 23, which is also angular in cross section, as is clearly shown in Fig. 2 of the drawings. The angles 24 of the groove 23 being produced by the outwardly extended flanges 25 with which the ring 21 is provided on its outer periphery.

When the parts are assembled as shown in Figs. 1 and 2 of the drawings, it is obvious that the shoulders or flanges 18 on the inner periphery of the outer ring or casing 15 will be located substantially concentrically at a distance from and with respect to the shoulders or flanges 25 on the outer periphery of the inner ring 21, and will thus afford two tracks or guide ways for the reception and operation of the reduced cylindrical portions 26 with which each end of each of the smaller rollers 20 is provided, as is clearly shown in Figs. 2 and 6 of the drawings.

It will thus be seen that the larger rollers 19 will track on the walls of the grooves 16 and 23 in the inner and outer surfaces of the ring or casing 15 and ring 21 respectively, while the reduced portions 26 of the smaller rollers 20 will track on the flanges 18 and 25 of said casing and ring, in other words, the two sizes of rollers will have indepenedent tracks or guide-ways. One of the flanges 25 of the ring 21 is provided in its periphery with a segmental recess 27 which is used to permit of the smaller rollers 20 being inserted in position between the ring 21 and casing 15 and between the larger rollers 19.

In Figs. 7 to 12 inclusive is shown a modification in the construction of the bearing which consists of an outer ring or casing 28 which is provided on its inner surface with a pair of inwardly extended flanges 29, which, as shown in Figs. 8 and 9 of the drawings are spaced apart in parallelism with one another and are located at slight distances from the ends of said casing. The inner ring 30 used in this modified construction, is provided on its outer periphery with a pair of outwardly extended flanges 31, which are also arranged in parallelism with one another and are located at some distance from the ends of the ring, as is clearly shown in Figs. 8 and 10 of the drawings. In the modification now under consideration, the larger rollers 32 are provided with annular grooves 33 to receive the flanges 29 and 31 on the outer ring or casing 28 and inner ring 30, as will be clearly understood by reference to Fig. 8 of the drawings, in which figure it will be seen and understood that the portion of each of the larger rollers 32, located between the grooves 33 thereof, is of sufficient size to rest against or to track snugly in the guide-ways or recesses formed by the flanges 29 and 31 on the rings 28 and 30 respectively, while the outer portions 34 of the larger rollers 32 will track in the guide-ways or recesses of said rings at the ends thereof or outwardly of the flanges of said rings. It will also be observed that the grooves 33 of the larger rollers are of sufficient depth to prevent the necks or portions which said grooves surround, contacting with the flanges 29 and 31 of the rings of the bearing. The smaller rollers 35 employed in this modification, are of substantially the same construction as the larger rollers, except that the grooves 36 with which the smaller rollers are provided, for the reception of the flanges 29 and 31 of the retaining rings, are more shallow than the grooves 33 of the larger rollers, so that the portions of the smaller rollers around which the grooves 36 are located will track on the flanges 29 and 31, while the portions of the smaller rollers, between the grooves 36 thereof will track in the space between the flanges 29 of the outer casing, and the flanges 31 of the inner ring 30, but so as not to contact therewith. The heads 37 of the smaller rollers are of less diameter than the heads or ends 34 of the larger rollers, as is clearly shown in Fig. 8 of the drawings, and said heads 37 will track in the guide-ways at the ends of the retaining rings, but in such a way as not to contact therewith, in other words, the smaller rollers 35 will have their bearings on the flanges of the retaining rings, while the larger rollers will have their bearings between said flanges and outwardly of the same.

In this modified construction, the ring 28 or casing is split as at 38, so that it can be sprung sufficiently to permit of the assemblage of the rollers 32 and 35 between it and the inner retaining ring.

From the foregoing, and by reference to the drawings, it will be readily understood and clearly seen, that, in the operation of the device, the inner ring which is adapted to carry the shaft, axle, or other part of a machine, will have, or exert greater pressure on some of the rollers than on others, and that those rollers which are subjected to considerable pressure between the outer and inner retaining rings, will be moved in pairs in the same direction as indicated by the arrows in Figs. 1 and 7 of the drawings.

Having thus fully described my invention, what I claim as new, and desire to secure by Letters Patent is—

1. In an anti-friction bearing device, the combination with an inner and an outer retaining member, of a plurality of rollers movably interposed between said members, said rollers being of two sets of different diameters and arranged alternately with respect to one another and each set of rollers having an independent bearing track or guide-way in the retaining members.

2. In an anti-friction bearing device, the combination with an inner and an outer retaining member located in substantially concentric relation and having annular grooves and flanges on their adjacent surfaces, of a plurality of large rollers and a plurality of smaller rollers movably interposed between said members and arranged alternately with respect to one another, the set of larger rollers having its bearings in said grooves and the set of smaller rollers having its bearings on said flanges of the retaining members.

3. In an anti-friction bearing device, the combination with an inner and an outer retaining member located in substantially concentric relation and both having an annular groove and a pair of flanges on their adjacent surfaces, of a plurality of large cylindrical rollers, and a plurality of smaller cylindrical rollers having reduced cylindrical portions at their ends, said rollers movably interposed between said retaining members and arranged alternately with respect to one another, the set of larger rollers having its bearings in said grooves and the set of smaller rollers having its bearings on said flanges of the retaining members.

LUDWIG W. ZAAR.

Witnesses:
   JEROME P. ZELENKA,
   CHAS. C. TILLMAN.